Sept. 17, 1968   L. E. LAMB   3,401,717

BALLCOCK FLOAT CONTROL MEANS

Filed Dec. 28, 1966

*Inventor*
LESLIE E. LAMB

United States Patent Office 3,401,717
Patented Sept. 17, 1968

3,401,717
BALLCOCK FLOAT CONTROL MEANS
Leslie E. Lamb, 4024 Waveland Ave.,
Chicago, Ill. 60641
Filed Dec. 28, 1966, Ser. No. 605,436
5 Claims. (Cl. 137—421)

ABSTRACT OF THE DISCLOSURE

An assembly is disclosed for a stem of a ballcock including a lever which intercepts the stem and is moved upwardly and downwardly therewith. The assembly limits upward movement of the stem until the buoyant force exceeds a preset amount to thereby urge an associated valve to quick closure.

---

The present invention relates to valves and, more particularly, to a mechanism for obtaining a quick shut-off of a ballcock after the associated tank has been refilled, which mechanism also increases the net buoyancy of the float to maintain effective closure of the valve.

In conventional ballcock installations such as in a water closet, a float is buoyantly supported on the surface of the water in the tank and is operatively connected to a ballcock to permit automatic refill of the tank after flushing. During the flushing cycle, the float lowers with the lowering water level thereby allowing the valve members in the ballcock to open and admit water. After the tank ball reseats on the outlet valve the refill cycle begins. The float then rises as it rides the surface of the water until it reaches the desired high-water level point in the tank causing the valve members in the ballcock to shut off the water supply.

Ballcocks have the undesirable characteristic of a very slow final or closing rate in the last increments of the refill cycle. For example, the tank in a conventional water closet installation may be almost completely filled within one minute after flushing; but, then one, three or more minutes may elapse before the water level rises the final fraction of an inch necessary for complete valve shut-off.

The reason for this action resides in the fact that once the rising water lifts the float of a ballcock assembly enough to appreciably reduce the size of the inlet orifice, the rate of flow into the tank decreases causing the float to rise more slowly. This, in turn, reduces the rate at which the valve members are brought together to close the valve.

However, during this period of deceleration of the valve closing rate, the orifice between the two valve members in the ballcock are in a mere "cracked-open" condition, and though the volume of water entering the tank is being gradually reduced, the velocity of the water flow is increased considerably. This action may be readily demonstrated by trying to stop, with one's thumb, the water from flowing through a faucet under normal line pressure.

Thus, since the float rises so slowly during the latter part of the cycle, there is a lengthy period of time, just prior to complete closure, in which the valve members are in a merely "cracked-open" state. It is during such periods in the refill cycle that most of the normal wear takes place in the ballcock, as sand and other suspended particles may be forced under line pressure through the small and ever decreasing orifice at constantly higher velocity. This type of wear, which is characteristic of ballcocks and is known as "wire drawing," causes a groove to be cut in one or both of the valve seat members. In time, the foregoing wear permits water to constantly leak into the tank in the interim between flushings and results in a rise in the water level with considerable water being wasted down the overflow pipe.

A ballcock is thus subjected to a prolonged period of such wear with each refilling of the tank after flushing. This is unlike a manually operated faucet which closes relatively fast and thus is normally not subjected to "wire-drawing" wear. When a manually operated faucet starts to drip, the faulty condition is readily apparent by the visible dripping taking place, and repairs may be readily made. However, since a ballcock is enclosed in a water closet, the faulty condition of the valve members is not readily visible. Often, by the time some undue water sounds are audible enough to indicate the valve needs attention, it will be discovered that not only the valve rubber is cut but that the rubber holder and valve stem have become so corroded and grooved as to be beyond repair.

Frequently, due to the difficulty of finding replacement parts for each particular brand and model of ballcock, a plumber or home owner finds it cheaper to buy and install an entirely new ballcock assembly rather than wait for a dealer to order replacement parts for the damaged unit.

Another cause of wire-drawing wear is due to the normal fluctuations in the line pressure in water supply systems. This is because a float in a conventional water closet installation, riding the surface of the water, will only become submerged enough to barely close the valve in the associated ballcock during the refill cycle. After the tank has been filled, any subsequent increase in line pressure will tend to let more water into the tank until the water has again risen high enough around the float and increases its degree of submersion to again close the valve.

Thus, assume that a tank has been flushed and the water pressure in the line is 20 pounds during the refill cycle and the float has closed the valve members in the ballcock. If the line pressure subsequently rises to 40 pounds, considerable wire-drawing wear will take place as more water is gradually forced into the tank before the water level rises sufficiently to give the float enough upward thrust to again effectively close the valve.

Accordingly, it is a principal object of the present invention to provide an assembly for eliminating source of ballcock valve wear.

It is another object of the present invention to provide an assembly for providing fast, full closure of a valve associated with a ballcock.

It is another object of the present invention to provide an assembly for interrupting the movement of a ballcock float as the ballcock rises with the water level and hold the valve members in a relatively wide-open position until the water has reached a normal, predetermined high-level mark and then release the float to rapidly close the valve.

The present invention allows the standard 4 x 5 float, which is in general use, to be submerged approximately fifty percent (50%) after closure instead of the usual twenty-five (25) or thirty percent (30%). The float controlled by this invention will prevent the valve from opening slightly when subsequent surges in line pressure occur. The valve is thereby held relatively wide-open until the water has reached its predetermined high-level mark, which then causes the float to release and quickly close the valve. After closure of the valve, the float is in a relatively more submerged state than is possible in a conventional water closet installation. In conventional installations the float merely rides the surface of the water and exerts only the minimum of potential buoyancy to close the valve, thereby unable to resist any subsequent increases in line pressure to maintain effective closure of the associated valve.

Accordingly, it is yet another object of the present invention to provide an assembly which provides positive closure of the valve for varying water pressures and maintains an effective closure in spite of variations in the water pressure.

In addition to the cost and bother of replacement and repairs of faulty ballcocks, water waste is a matter of growing concern to home owners with private wells, and of communities throughout the nation.

Accordingly, it is still another object of the present invention to prevent water waste and to provide a mechanism that will minimize ballcock maintenance costs, reduce tank refill time, be economical to produce and easy to install on most conventional-type water closets.

While the invention will be discussed in the present case as specifically applied to a conventional ballcock and water closet installation, it will be readily understood to be applicable to other uses.

The novel features which are believed to be characteristic of the invention are set forth with particularity in the appended claims. The invention itself, together with further objects and advantages thereof, will be best understood by reference to the following description taken in conjunction with the accompanying drawings, in which:

BALLCOCK APPARATUS

Ballcock assemblies for water closets are old and well-known. Accordingly, only a brief description will be made of the conventional-type ballcock shown here.

Figure 1:
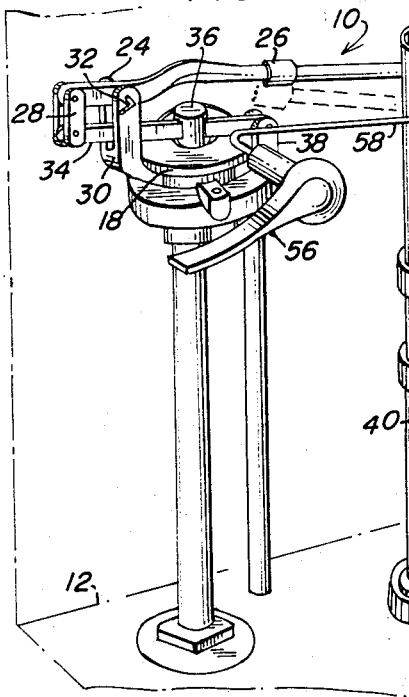
FIG. 1 is a view in perspective of the operative portion of the assembly of the present invention shown in conjunction with a conventional installation of water closet fittings; and, with the associated float in its highest position.
Figure 3:
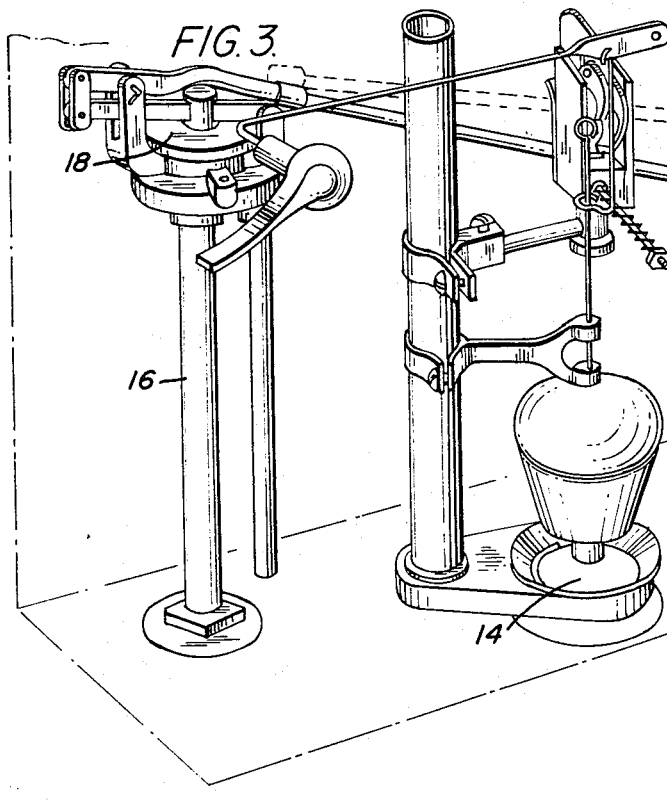
FIG. 3 is a view in perspective of the assembly of FIG. 1 showing the valve apparatus in open position.

Referring to FIGS. 1 and 3, the float valve assembly, known as a ballcock, is indicated generally at 10 and is mounted in tank 12. The tank 12 has an outlet opening 14, generally referred to as a flushing outlet. Water enters tank 12 through standpipe 16. A water inlet valve 18 is affixed to the top of standpipe 16 to control the flow of water through standpipe 16. The inlet valve 18 is controlled by a float member 20 which is connected to one end of float arm 22; the opposite end of float arm 22 being connected to inlet valve control assembly 24. The inlet valve control assembly 24 is adapted to move the inlet valve 18 to varying control positions in response to changing water level in the tank. Assembly 24 includes arm 26 connected to float stem 22 and pivotally connected to linkage 28. Trunnion bracket 30 defines a pivotal support member 32 for arm 26. Link arm 28 is pivotally connected to valve element control arm 34, said arm 34 passing through valve grip 36 and being pivotally connected at its other end on pivot member 38. Overflow pipe 40 extends upwardly in tank 12 and defines an upper terminal 41 at the maximum predetermined water level desired in the tank.

The outlet closure assembly includes a valve seat member 42 and a valve 44. Valve stem 46 extends from the valve 44 of the closure assembly through a valve stem guide member 48 affixed to overflow pipe 40 by any suitable means. The outlet valve is opened manually by depressing control trigger 56 which is rigidly affixed to one end of a crank arm 58. The other end of arm 58 is provided with openings 60 extending therethrough.

One end of an outlet valve 44, lifting stem 64 extends through an opening 60 of arm 58, the other end is slidably mounted on outlet valve stem 46. Valve stem 46 includes an enlarged end 47 which is engaged by member 64 to move upwardly as the outlet valve 44 is operated to an open position.

FLOAT CONTROL MEANS

Figure 2:
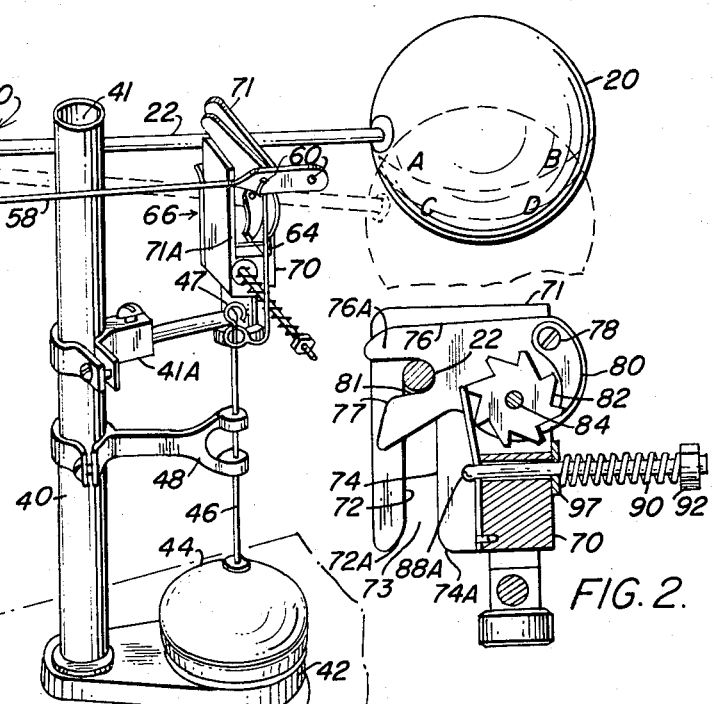
FIG. 2 is an enlarged view, partially in cross section, of the operative portion of the present invention taken generally along lines 2—2 of FIG. 1, and showing the invention after the float has risen to close the valve.
Figure 4:
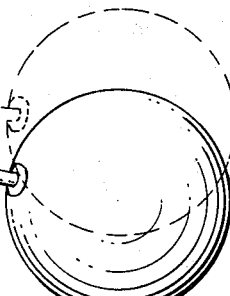
FIG. 4 is an enlarged view, partially in cross section, of the operative portion of the present invention taken generally along the lines 4—4 of FIG. 3 and showing the invention with the float stem in the lowest position and the valve open.

The float assembly 10 includes a float control means indicated generally at 66, and shown relatively enlarged and in partial cross section in FIGS. 2 and 4. The float control means 66 is affixed to the overflow pipe 40 by any suitable known means such as an arm and bracket assembly, generally labeled 41A.

The control means 66 comprises a structure 70 which has a base portion 70A and two upstanding plates 71 and 71A, and an end view is bifurcated or U-shaped. The plate 71, forming one vertical side of the U-shape, is relatively wider than the plate 71A forming the opposite vertical side of the U-shape. The plate 71 has a downwardly extending slot 73 defined by edges 72 and 74 in plate 71. The lower end of the slot 73 includes beveled or outwardly flaring portions 72A and 74A for guiding the entrance of the arm 22 into the slot 73 as will be explained hereinbelow.

A pivoting lever 76 is affixed to plate 71 as by a shaft or bolt 84. Another shaft affixes a pawl 80 to pivoting lever 76, as will be described. The pivoting lever 76 includes an extending arm portion 76A having a slot 75 defined by edges 79 and 81 which slot cooperates with the slot 73 in plate 71. More specifically, the arm 22 as it rises in slot 73 of plate 71 also moves into slot 75 of lever 76.

In view of the close spacing in the drawings of FIGS. 2 and 4, some of the reference characters are placed only on FIG. 2 and other reference characters are placed only on FIG. 4.

As arm 22 rises it engages the edge 79 of slot 75 and causes the lever 76 to pivot clockwise about the shaft 84. When the arm 22 moves downwardly in slot 75 it engages the lower edge 81 of lever 76 and causes the lever 76 to pivot counterclockwise about shaft 84.

A ratchet 82 is also mounted on shaft 84 to cooperate with the pawl 80, as will be explained.

A rigid bar member 86 has its lower edge fulcrumed and positioned vertically as by a rivet or pin 94 to one side 91 of the base portion 70A of the structure 70. The upper end of the bar member 86 is biased against the teeth of the ratchet 82 by a threaded rod 88 which includes an enlarged end 88A which bears against the bar 86. Note that the upper end 86A of the bar 86 is bent outwardly to accommodate the contour of the ratchet 82 teeth. The force applied by rod 88 on bar 86 is controlled by adjusting a nut 92 on rod 88 to control the pressure applied by a coil spring 90 through washer 97 against the opposing side 93 of base 70A. The bar 86 and ratchet 82 thus provide a spring-biased ratchet assembly. As the nut 92 is tightened on the threaded rod 88, the rod 88 is pulled against the bar 86 to increase its biasing force against the teeth of ratchet 82.

OPERATION OF FLOAT CONTROL MEANS

Operation of the float assembly and the float control assembly will now be explained. As seen in FIGS. 1 and 2, the assembly is in a stable condition with the tank 12 filled with water. In this position the water has reached its predetermined high level and is pressing upward around float 20, as shown by dotted line A–B (FIG. 1), forcing the float to its "up" position where it has closed valve 18 isolating it from the fluid source, not shown.

When the lever 56 is depressed to open the outlet valve and permit discharge of water from tank 12, float 20 will descend with the lowering of the water level opening valve 18. As float arm 22 descends, it is confined to a path defined by the slot 73 in plate 71. Float arm 22 is descending will also rotate lever 76 counter-clockwise lifting pawl 80 to the next tooth higher on ratchet 82. This action is assured by slight pressure of float arm 22 against shoulder 77 of lever 76 as it descends. When the tank 12 has been flushed, and the water remaining in the tank is insufficient to support the tank ball 44, the tank ball will drop back onto seat 42 and the tank will begin to refill. Float 20 is now at its "low" position, as shown in FIG. 3.

As the water level rises in tank 12 it lifts float 20 to a position as shown by dotted lines in FIGS. 1 and 3 with float arm 22 as shown by dotted lines in FIG. 4 engaging and pressing upward against edge 79 of slot 75 in lever 76. Float arm 22 is confined in its upward thrust to the path defined by the edges 72 and 74 of slot 73 in plate 71, FIG. 4. Valve 18 is still open but float 20 is now stopped in its upward movement as it lacks the buoyancy required to overcome the pressure of spring 90 which is maintaining float arm 22 in a trapped or caught state under edge 79 of slot 75 in lever 76 as well as in slot 73 of plate 71, FIG. 4.

When the water level rises to a predetermined high level as shown by dotted lines A-B, FIG. 1, float 20 will be about seventy-five percent (75%) submerged as indicated by dotted lines of the float 20 in FIG. 1; whereupon the net buoyancy increases sufficiently to overcome the pressure of spring 90, and float stem 22 will be released and rises to rapidly close the valve. As stem 22 rises, lever 76 is rotated in a clockwise direction to advance ratchet 82 one tooth or step. Ratchet 82 will again come to rest, being positioned by bar 86. Float 20 is now in its "up" position with valve 18 closed and with the water level still as shown by dotted lines A-B, FIG. 1, and with float 20 now being about fifty percent (50%) submerged instead of seventy-five percent (75%). For comparison purposes, the dotted lines C-D represent approximately a twenty-five percent (25%) submersion of the float 20 of a conventional ballcock after closure. Note that the entire float control means, including ratchet assembly 66, is freely accessible and is external to the valve assembly comprising valve 18.

While the invention has been particularly shown and described with reference to a preferred embodiment thereof, it will be understood by those skilled in the art that changes in form and details may be made therein without departing from the spirit and scope of the invention.

I claim:
1. A control apparatus for a ballcock float having the float connected through a stem to actuate a valve comprising, in combination:
 (a) a stem intercepting assembly;
 (b) means for guiding the stem of the associated ballcock into engagement with said assembly;
 (c) said assembly limiting upward movement of said stem until the buoyant force provided by the float exceeds a set amount whereby said assembly is tripped to permit the stem to move upward and urge the associated valve to quick closure;
 (d) a pivoting lever positioned to intercept the movement of said stem whereby the upward movement of said stem causes said pivoting lever to be moved to a first direction, and a downward movement of said stem causes said pivoting lever to move in an opposite direction;
 (e) a ratchet and pawl mounted for cooperative rotation with said pivoting lever;
 (f) a bar member mounted adjacent said ratchet assembly and providing a restraining force thereon;
 (g) a rod engaging bar member;
 (h) a spring on said rod; and
 (i) means for controlling the pressure applied through said spring and rod assembly to said bar member, whereby the tension provided to said ratchet is selectively controlled to permit selective actuation of said pivoting lever.

2. An assembly as in claim 1 wherein:
 (a) said pivoting lever includes a slot which receives said stem; and
 (b) wherein said spring and rod control permit adjustment of the force applied through said bar member to said ratchet.

3. A control apparatus for a ballcock float having the float connected through a stem to actuate a valve comprising, in combination:
 (a) a stem intercepting assembly including a pivoting lever positioned to intercept the movement of said stem, upward and downward movement of said stem causes said pivoting lever to be moved in accordance therewith;
 (b) said lever having a first continuous restraining force acting thereupon for limiting upward movement of said stem until the buoyant force provided by the float exceeds said restraining force whereby said lever is actuated to permit the stem to move upward and urge the associated valve to quick closure.

4. An assembly as in claim 3 wherein:
 (a) a ratchet and pawl are mounted for cooperative rotation with said pivoting lever;
 (b) a bar member mounted adjacent said ratchet assembly and applying said restraining force through said ratchet assembly to said lever;
 (c) means for controllably applying pressure to said bar member, whereby said restraining force is selectively controlled to permit selective actuation of said pivoting lever.

5. An assembly as in claim 3 wherein:
 (a) said pivoting lever includes a slot which receives said stem, and further including,
 (b) a rod engaging said bar member, and a spring mounted on said rod means for controllably applying pressure through said spring and rod to said bar member.

References Cited
UNITED STATES PATENTS

| | | | |
|---|---|---|---|
| 1,070,820 | 8/1913 | Lamont | 137—421 X |
| 1,464,022 | 8/1923 | Baumgardner | 137—446 |
| 1,885,424 | 11/1932 | Fischer | 137—416 |
| 2,013,188 | 9/1935 | Reinhardt | 137—420 X |

WILLIAM F. O'DEA, Primary Examiner.

D. R. MATTHEWS, Assistant Examiner.